INVENTOR.
EDWARD V. B. REGAN
BY
*Christel & Bean*
ATTORNEYS

Nov. 30, 1965  E. V. B. REGAN  3,220,769
AUXILIARY SEAT FOR VEHICLES
Filed Sept. 13, 1963  2 Sheets-Sheet 2

INVENTOR.
EDWARD V.B. REGAN
BY
Christel & Bean
ATTORNEYS

United States Patent Office
3,220,769
Patented Nov. 30, 1965

3,220,769
AUXILIARY SEAT FOR VEHICLES
Edward V. B. Regan, 20 Melbourne Place,
Buffalo 22, N.Y.
Filed Sept. 13, 1963, Ser. No. 308,789
3 Claims. (Cl. 297—384)

This invention relates to a new and useful child's seat which is particularly adapted for use in a vehicle in conjunction with a vehicle seat belt, although its utility is not limited thereto.

Seat belts have proven to be effective in reducing the possibility of serious injury to vehicle occupants upon impact. They can be used with children, as well as adults, and offer the additional advantage of preventing the child from moving about in the vehicle. However, these potential advantages often cannot be realized with children, because they object to being strapped down on vehicle seat cushions where they cannot see out the windows. Also, seat belts tend to cross the abdomen of a child when seated on the usual seat cushion, and not the hips, which is undesirable because strain on the abdominal area can damage the internal organs of a child.

Accordingly, the primary object of my invention is to provide a means adapting children to vehicle seat belts, so that they too can take advantage of the protection afforded thereby.

Another object of my invention is to provide a seat which, when used in an automobile, elevates the child to a position in which he can see over the dashboard and out the windows, and which is particularly adapted for use in conjunction with a vehicle seat belt.

An additional object of my invention is to provide a seat which cushions the child, and which is wrapped around the child to enclose him in the cushioning material of the seat when a vehicle seat belt or the like is used in conjunction therewith.

Still another object of my invention is to provide a seat adapted for use in vehicles in conjunction with a seat belt and which automatically accommodates itself to children of different sizes and weights.

It is also an object of my invention to provide a seat which cushions a child against a seat belt and which tends to distribute the restraining force of a seat belt across the child's body upon a sudden stop.

In addition, an object of my invention is to provide a child's seat adapted for use in conjunction with a vehicle seat belt and having means preventing forward tilting of the vehicle seat back.

A child's seat constructed in accordance with my invention is characterized in one aspect thereof by the provision of opposite side wall portions and a seat portion recessed relative thereto, the seat and side wall portions being resiliently compressible, and the side wall portions being resiliently flexible about a child on the seat portion.

In another aspect thereof, a child's seat constructed in accordance with my invention is characterized by the provision, in combination with a vehicle seat having a back and a cushion, and a seat belt fixed to extend across a portion of the cushion, of a resiliently yieldable body having a seat portion and opposite side wall portions extending upwardly above the seat portion, the seat body being positioned on the vehicle seat cushion against the vehicle seat back, and at least one of the side wall portions being flexed inwardly by the vehicle seat belt about a child occupying the child's seat.

The foregoing and other objects, advantages and characterizing features of my invention will become clearly apparent from the ensuing detailed description of an illustrative embodiment thereof, considered in conjunction with the accompanying drawing depicting the same both with and without a supporting frame, wherein like reference numerals denote like parts throughout the various views, and wherein.

Figure 1:
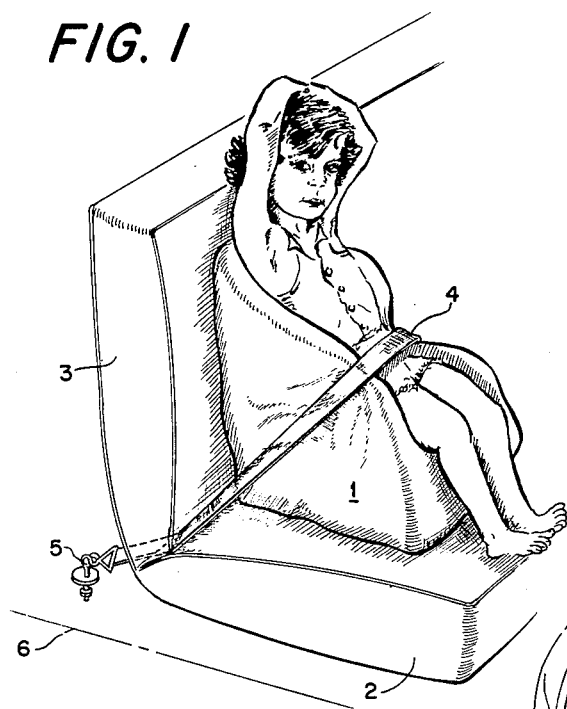
FIG. 1 is a perspective view of a child's seat constructed in accordance with my invention in use in a vehicle, the child being strapped in the seat by a conventional vehicle lap strap.
Figure 2:
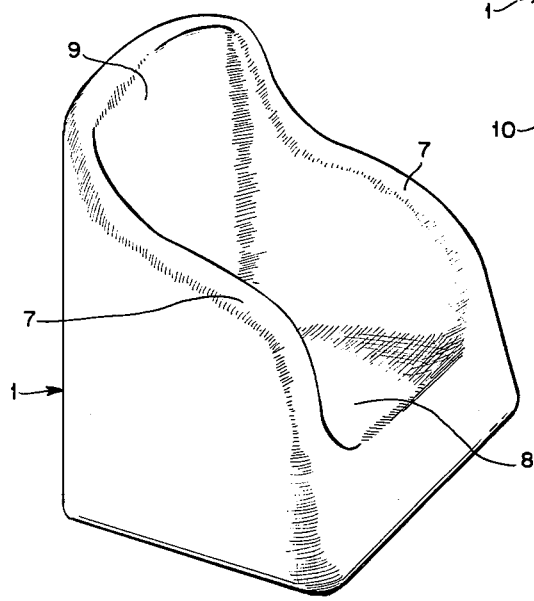
FIG. 2 is a perspective view of the seat of FIG. 1, on an enlarged scale, showing the same unoccupied.

Referring now in detail to the accompanying drawings, there is shown in FIG. 1 a child's seat of my invention, generally designated 1, in use in an automobile having a seat provided with the usual seat cushion 2 and seat back 3, and also having a conventional seat belt 4 of the lap strap type. Belt 4 is fastened in the usual manner to anchor bolts 5 secured to the vehicle floor indicated at 6.

Seat 1 is formed of a resiliently compressible material, such as a polyurethane sponge, so as to be resiliently yieldable throughout. In the illustrated example, seat 1 is molded in one piece of flexible urethane foam, and is solid throughout, although other resiliently yieldable constructions, such as pneumatically inflated rubber, could be used.

Figure 5:
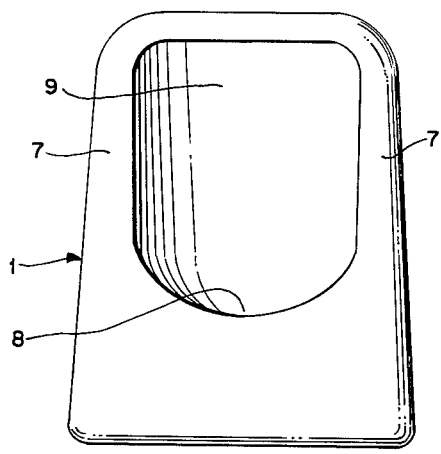
Figure 6:
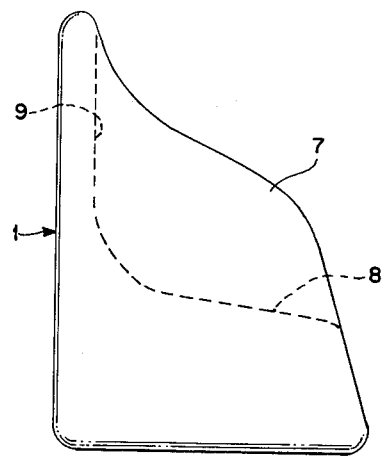

Seat 1 is formed to provide a pair of opposite side wall portions 7, a seat cushion portion 8 and a seat back portion 9. The cushion and back portions 8 and 9 are recessed, relative to the side wall portions 7, which extend upwardly above cushion portion 8 and outwardly beyond back portion 9. In the illustrated embodiment, side walls 7 taper upwardly, as clearly indicated in FIGS. 5 and 6.

Cushion portion 8 provides a base of substantial depth, far in excess of the thickness required for cushioning purposes alone, to materially elevate an occupant of seat 1. For example, the depth of cushion portion 8 is several times the thickness of side wall portions 7 and back portion 9. Also, the top surface of cushion 8 preferably slopes downwardly and forwardly, to compensate for the rearwardly sloping surface of most seat cushions 2.

In use, seat 1 is placed on the vehicle seat cushion 2, against the seat back 3, as illustrated in FIG. 1. The substantial depth of cushion portion 8 elevates the child well above the level of seat cushion 2, to a height where the child can see over the vehicle dashboard and out the vehicle windows. As a result of being able to see, the child's usual tendency to stand and move about is greatly reduced. In addition, seat 1, being of a resiliently compressible, yieldable material, cushions the child in a manner which, together with the elevated position afforded the child, makes the seat comfortable for the child, so that he or she is content to remain seated in the seat 1 and under the seat belt 4 for long periods of time. This has the significant advantage of reducing the distraction, to the driver, of a child moving about, while providing the child with the protection that a seat belt can offer.

The seat belt 4 is applied around the child, and the seat 1, as shown in FIG. 1. Thus, belt 4 is brought upwardly around the opposite side walls 7 of the seat 1, and across the hips of the child, being tightened around the child and seat in the same manner as it would be tightened around an adult occupying that portion of the vehicle seat. When this is done, the entire side wall structure of the seat 1 is flexed around the child's body, and particularly the upstanding wall portions 7 which are flexed inwardly about the child, whereby the seat 1 is wrapped around the body of the child in conforming, cushioning relation thereto, as clearly shown in FIG. 1.

This provides several advantages. It further cushions the child, wrapping him in the resiliently yieldable, cushioning material of the seat 1 and making him feel more comfortable and secure. In addition, the seat provides a cushion between the child and the belt 4, which tends to distribute and thereby relieve the restraining force and stress of the belt on the child. Also, the friction surface provided by the seat against the belt holds the latter in proper position around the hips of the child, and reduces any tendency of the belt to slip upwardly over the abdomen which is undesirable from a strain point of view.

Furthermore, whereas conventional lap straps tend to go over the abdomen of a child, the added elevation provided by seat 1 facilitates placement of the belt over the hips, instead of the abdomen, which is desirable so as to avoid the dangers associated with strain on a child's abdomen.

Thus, in use, the seat of my invention provides a comfortable, elevated seat for the child. In addition, it adapts a child to a conventional vehicle seat belt, and when so used it provides an additional cushioning effect, being further wrapped around the child by the application of the seat belt. While only a seat belt of the lap strap type is shown, it will be obvious that shoulder strap and harness also can be used in conjunction with the seat of my invention. The seat of my invention also is susceptible of use as a seat apart from a vehicle.

While the back portion 9 of the seat of my invention can be omitted, it is preferred that the seat have a back for the additional comfort and cushioning effect provided, and to enable the seat to be used apart from a vehicle seat, in which case the presence of a seat back is preferred.

Figure 3:
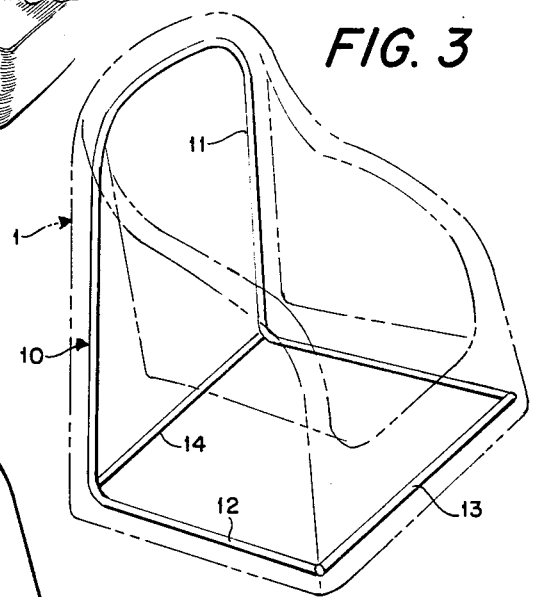
FIG. 3 is a view corresponding to that of FIG. 2, but showing a supporting frame with the seat indicated in phantom.
Figure 4:
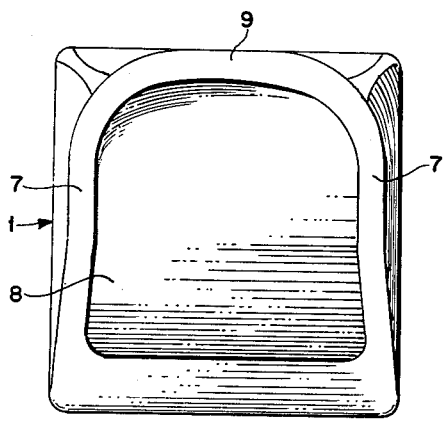
FIGS. 4, 5, and 6 are top plan, front elevational and side elevational views, respectively, of the child's seat of FIG. 2.

A further advantage is offered by the seat of my invention, in that it offers resistance to forward tilting of seat back 3 onto cushion 2 in vehicles so equipped. This occurs both because of the bulk of seat 1, at the juncture between back 3 and cushion 2, and because it places the child's body at a higher elevation on back 3. Where increased resistance is desired, the resiliently yieldable body of seat 1 can be provided in conjunction with a rigid supporting frame, such as shown in FIG. 3 and generally designated 10. Frame 10 is formed of tubular or bar stock, or the like, to provide an upstanding, generally inverted U-shaped back portion 11, the legs of the U extending outwardly at right angles, as shown at 12, and being joined at their ends by a crossbar 13, to comprise a cushion portion for the frame. A second crossbar 14 joins the sides of the frame adjacent the juncture between portions 11 and 12. The seat body, comprising the resiliently yieldable material, can be molded about the frame 10, or they can be otherwise interconnected.

While the provision of a supporting frame 10 may be desirable under some circumstances, for the reasons pointed out, it is seen that my seat is fully useful and accomplishes its primary purpose without such a frame.

Accordingly, it is seen that my invention fully accomplishes its intended objects. Indeed, I have found that a child in the seat feels so comfortable and secure that he or she often is perfectly content to remain strapped in the seat even when the parent leaves the vehicle for short periods of time.

While I have disclosed and described in detail only one embodiment of my invention, that has been done by way of illustration only, it being intended that the scope of my invention be defined by the appended claims.

Having fully disclosed and completely described my invention, and its mode of operation, what I claim as new is:

1. An auxiliary seat comprising, in combination with a vehicle having a seat and a seat belt associated therewith, a unitary body of resiliently flexible material having opposite side wall portions and seat back and cushion portions recessed relative thereto, said side wall portions extending upwardly from said seat cushion portion and forwardly from said seat back portion substantially to the forward portion of said auxiliary seat, said body being positioned on said vehicle seat and the forward upper portion of said side wall portions being flexed by said belt inwardly around and in front of an occupant of said auxiliary seat in conforming relation thereto whereby a seat occupant is wrapped in the material of said auxiliary seat.

2. A seat as set forth in claim 1, wherein the height of said seat cushion portion above the bottom of said auxiliary seat is several times the thickness of said side wall portions, thereby substantially elevating an occupant of said auxiliary seat relative to said vehicle seat.

3. A seat as set forth in claim 1, wherein the material of said auxiliary seat body comprises polyurethane sponge.

References Cited by the Examiner

UNITED STATES PATENTS

| | | | |
|---|---|---|---|
| 2,664,140 | 12/1953 | Kindelberger | 297—231 |
| 2,712,849 | 7/1955 | Exton | 297—216 |
| 2,838,100 | 6/1958 | Follows | 297—421 |
| 3,093,407 | 6/1963 | Wilson | 297—4 |
| 3,136,579 | 6/1964 | Hunter | 297—385 |

FRANK B. SHERRY, *Primary Examiner.*